(12) United States Patent
Tarchinski et al.

(10) Patent No.: US 8,466,586 B2
(45) Date of Patent: Jun. 18, 2013

(54) HIGH-VOLTAGE TERMINAL ASSEMBLY WITH INTEGRAL HIGH-VOLTAGE INTERLOCK

(75) Inventors: James E. Tarchinski, Rochester Hills, MI (US); William J. Omell, Washington Township, MI (US); Keith D. Van Maanen, Birmingham, MI (US); Ryan M. Meroz, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1293 days.

(21) Appl. No.: 12/244,838

(22) Filed: Oct. 3, 2008

(65) Prior Publication Data

US 2010/0084205 A1 Apr. 8, 2010

(51) Int. Cl.
*F16P 3/20* (2006.01)

(52) U.S. Cl.
USPC ............... 307/328; 108/65.1; 439/350

(58) Field of Classification Search
USPC ............................................. 307/328
See application file for complete search history.

(56) References Cited

U.S. PATENT DOCUMENTS

| 7,084,361 | B1 * | 8/2006 | Bowes et al. ............... 200/16 R |
| 7,402,068 | B1 | 7/2008 | Tarchinski |
| 7,508,097 | B2 * | 3/2009 | Furuta et al. ................. 307/328 |
| 7,586,722 | B2 * | 9/2009 | Scholer et al. ................. 361/88 |
| 2009/0053588 | A1 * | 2/2009 | Marukawa .................... 429/97 |
| 2009/0149048 | A1 * | 6/2009 | Pavlovic et al. .............. 439/181 |

* cited by examiner

*Primary Examiner* — Rexford Barnie
*Assistant Examiner* — Toan Vu
(74) *Attorney, Agent, or Firm* — Quinn Law Group, PLLC

(57) ABSTRACT

A vehicle includes a high-voltage (HV) energy storage system (ESS), an HV device having HVIL source and return (SR) pins and an HV receptacle, an HV cable, and an HV terminal assembly. The assembly includes a tray portion and retainer for aligning the HV cables with the HV receptacle. An HVIL jumper device is connected to the tray portion and electrically connectable to the HVIL SR pins. The assembly includes a cover portion removably mountable to the tray portion to provide a suitable EMF shield and weather seal. The cover portion includes an HVIL shorting plug. HV electrical energy is supplied from said ESS to the HV device only when all three of the HVIL components, i.e., the HVIL SR pins, the HVIL jumper device, and the HVIL shorting plug, are electrically interconnected to form a closed HVIL circuit, while at the same time the HV cable is properly connected.

15 Claims, 2 Drawing Sheets

HIGH-VOLTAGE TERMINAL ASSEMBLY WITH INTEGRAL HIGH-VOLTAGE INTERLOCK

TECHNICAL FIELD

The present invention relates generally to a vehicle electrical system, and in particular to a high-voltage terminal assembly with high-voltage interlock or HVIL capability for use with an electric, hybrid, fuel cell, or other high-voltage propelled vehicle.

BACKGROUND OF THE INVENTION

In a high-voltage propelled vehicle (HVPV), such as a hybrid-electric vehicle (HEV), a plug-in hybrid electric vehicle (PHEV), a fuel cell electric vehicle (FCEV), or an electric vehicle (EV), a high-voltage (HV) power supply or energy storage system (ESS), for example a rechargeable battery pack or other HV electrochemical energy storage device, provides a source or supply of at least a portion of the HV electrical power required for propelling the vehicle. In some configurations an internal combustion engine can shut off or selectively power down whenever the vehicle is idling or at a standstill in order to conserve fuel, and/or the vehicle can run entirely on HV electrical power provided by the ESS, depending on the particular design of the vehicle.

To provide sufficient HV electrical power for partially or fully propelling the vehicle, as well as to energize various HV components onboard the vehicle, the ESS contains or stores a relatively high potential energy or voltage, typically on the order of approximately 60 to 300 volts or more. Common HV components used onboard a typical HVPV can include, for example, one or more electric motor/generators, an air conditioning control module (ACCM), a power steering controller, a power inverter module (PIM), an auxiliary power unit or module (APM), and/or other HV devices.

Within a given HV vehicle component, the HV electrical connection is ordinarily made by bolting or fastening a standard 2-phase or 3-phase HV electrical cable to an HV receptacle and/or a bus bar. To protect against unintended access to the HV circuit onboard the vehicle, many manufacturers utilize what is known as a high-voltage interlock loop or HVIL circuit. An HVIL circuit is a specially adapted low-voltage circuit usually energized by a 12-volt auxiliary battery, and adapted for disconnecting an HV power supply while safely discharging any localized electrical energy charge. The HVIL circuit is commonly routed to a potential HV access point, such as a connection box or splicing junction into an HV device. The HVIL circuit senses any potential access to the HV access point by detecting a change in certain electrical characteristics of the low-voltage wires or lines forming the HVIL circuit.

Typically, the HVIL lines are routed to the same locations or access points in the vehicle as are the HV cables. Conventionally, therefore, low-voltage HVIL lines are co-bundled with the HV cables and routed in tandem to the various HV access points. However, bundling in this manner can be less than optimal due largely to the widely disparate gages of the respective sets of lines or cables. Any vibration, motion, or bending of the relatively large gage HV cables can potentially affect the durability of any co-bundled smaller gage HVIL lines over time. Moreover, regardless of the durability concerns raised by bundling disparate gage wires or cables in a dynamic system such as an automotive vehicle, conventional HV connection methods also do not optimally determine whether an HV connector is properly in position or is properly installed before an HVIL circuit is closed.

SUMMARY OF THE INVENTION

Accordingly, a high-voltage (HV) connector or terminal assembly is provided that utilizes high-voltage interlock (HVIL) circuitry both to detect an attempted access to an HV circuit onboard a vehicle as well as to detect a proper electrical connection or installation of HV cabling to an HV device prior to energizing the HV circuit. The HV terminal assembly can work with a conventional ring terminal configuration as well as other HV connection devices. Since the HV terminal assembly is integrated with the HVIL circuit of the vehicle, no additional parts or components such as limit switches or other potentially welded, corroded, or frozen switching devices are needed to accurately sense or detect a complete and proper connection of HV cables after vehicle assembly or subsequent vehicle service work. Unlike the conventional methods described above, according to the invention low-gage, low-voltage HVIL cabling or wiring is not co-routed with high-gage HV cabling, thus optimizing the long-term durability of the HVIL circuit. These are just some of the benefits that follow from the present invention as described below, and those of ordinary skill in the art can readily envision other associated technical, manufacturing, and/or component or vehicle production efficiency advantages and benefits.

The HV terminal assembly utilizes an embedded HVIL jumper device and a shorting plug such that the HVIL circuit is automatically opened prior to an operator or technician accessing the connected HV device at a given HV access point. The low-voltage HVIL circuit cannot be closed again unless and until the HV terminal assembly is again properly connected or assembled. The HVIL jumper device can be fabricated as part of the HV terminal assembly as described below, and the HVIL shorting plug can be fabricated as part of a separate, removably mountable cover portion for the HV terminal assembly. The HVIL jumper device acts as a necessary interface that is interposed or positioned between the HVIL source and return (SR) pins of an HVIL harness within or on the HV device and the HVIL shorting plug. The low-voltage HVIL circuit is closed only when the HVIL shorting plug is properly connected to the HVIL jumper device and when the HVIL jumper device is in turn connected to the HVIL SR pins.

Within the scope of the invention, a vehicle includes an energy storage system or ESS adapted for storing and supplying HV electrical energy, an HV device having HVIL source and return (SR) pins and an HV bus bar or receptacle, an HV cable, and an HV terminal assembly. The HV terminal assembly includes a generally concave box or tray portion and a retainer adapted for securing the HV cables and aligning them with an HV receptacle on the HV device. The tray portion can be mounted to the HV device, for example by using a set of threaded bolts or other suitable fasteners.

The HVIL terminal assembly includes the HVIL jumper device, which is operatively connected to the tray portion or formed integrally therewith, and which is electrically connectable directly with the HVIL SR pins. The HV terminal assembly also includes a cover portion that is removably mountable to the tray portion to provide a suitable EMF shield and weather seal for the HV access point, again using any suitable type of fastener. The cover portion includes an HVIL shorting plug or an appropriate attenuating resistor. HV electrical energy is supplied from said ESS to the HV device only when all three of the HVIL components, i.e., the HVIL SR pins, the HVIL jumper device, and the HVIL shorting plug, are electrically interconnected to each other to form a closed HVIL circuit, while at the same time the HV cable is properly connected.

The HV device can be configured as either a two-phase or a three-phase electrical device, such as but not limited to a power inverter module (PIM), an auxiliary power module (APM), an electric motor/generator, etc. The HV device includes a signal connector that is electrically connected to the auxiliary power supply, such as via a low-voltage wiring harness routed to or within the HV device. The signal connector detects, senses, or otherwise determines when each the HVIL SR pins, the HVIL jumper device, and the integral HVIL shorting plug are all properly interconnected to form the closed HVIL circuit. Only when the three HVIL devices are properly connected is HV power made available to the HV device.

As will be explained below, the HV terminal assembly is configured to prevent the direct electrical connection of the HVIL shorting plug of the cover portion and the HVIL SR pins of the HV device. Various means are possible for achieving this result, such as but not limited to configuring the HVIL shorting plug in the cover portion and the HVIL SR pins so that such a direct connection is physically impossible, e.g., configuring each HVIL device as incompatible male or female connections. Alternately, the spacing and/or fit of the cover portion to the HV device can be configured, sized, and/or shaped so as to provide a gap between the HVIL shorting plug in the cover portion and the HVIL SR pins that can only be closed via the interposition of the HVIL jumper of the HV terminal assembly.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
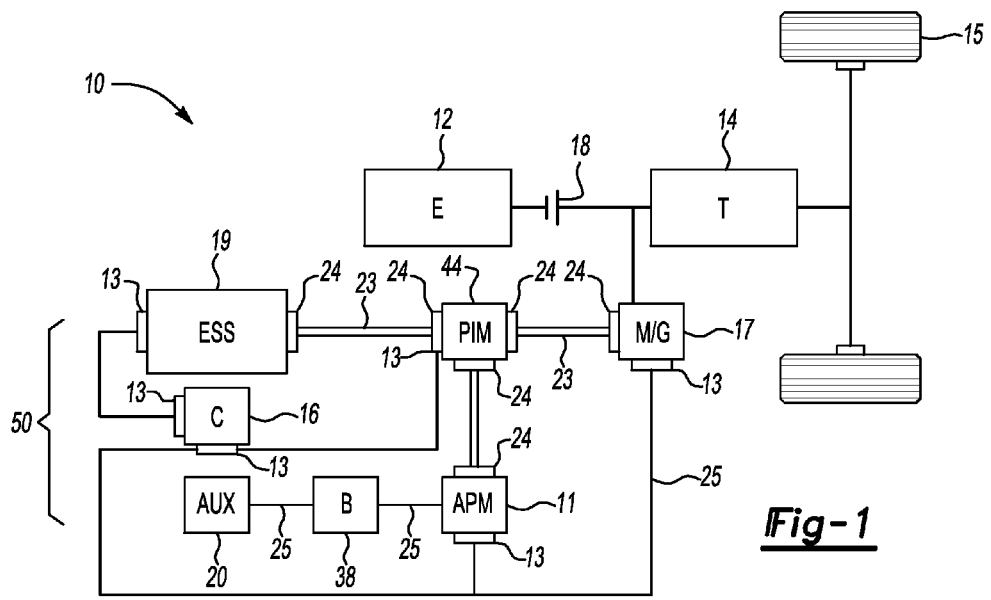
FIG. 1 is a schematic illustration of a high-voltage propelled vehicle or HVPV having a high-voltage (HV) power supply and at least one HV device.

Referring to the drawings, wherein like reference numbers refer to like components, and beginning with FIG. 1, a vehicle 10 is configured as a high-voltage propelled vehicle (HVPV) such as an exemplary hybrid-electric vehicle (HEV) as shown. Other HVPV vehicle configurations are possible within the scope of the invention, such as: a fuel cell electric vehicle (FCEV), a purely electric vehicle (EV), a plug-in hybrid electric vehicle (PHEV), etc. The vehicle 10 of FIG. 1 includes an internal combustion engine (E) and a transmission (T) 14 that can be selectively connected to the engine 12 for the transmitting of torque to a set of road wheels 15, which can propel the vehicle 10 in a front wheel drive, four wheel drive, all wheel drive, or rear wheel drive configuration depending on the design of the vehicle 10.

The transmission 14 can be a conventional automatic or a manual geared transmission, an electrically variable transmission, or other transmission design without departing from the scope of the invention. Depending on the particular design of the vehicle 10, a clutch device 18 can be provided to selectively disconnect the engine 12 from the transmission 14 as needed, such as to allow vehicle propulsion via an alternate energy source, e.g., an electric motor/generator (M/G) 17.

Regardless of the powertrain configuration, high-voltage (HV) electrical energy on the order of approximately 60-300V or more is supplied onboard the vehicle 10 to various HV devices to thereby generally define an HV circuit. Such HV devices can include, without being limited to, a power inverter module or PIM 44, the electric motor/generator (M/G) 17, the ESS 19, an auxiliary power unit or module (APM) 11, and/or any other HV devices that might be provided or included with the vehicle 10.

For storage and supply of the HV electrical energy, an energy storage system (ESS) 19 is electrically connected to the M/G 17 through the PIM 44 via HV lines or cables 23. As will be understood by those of ordinary skill in the art, the HV cables 23 contain HV conductors within a suitable semi-flexible dielectric insulating coating, such as polyethylene, rubber, fluorocarbon, or another suitable dielectric or insulating material. The PIM 44 is electrically connected to the ESS 19 and the APM 11 via similar sets of HV cables 23 as described above. A general purpose or top-level electronic control unit or controller (C) 16 is also provides various top-level control and coordination of the various systems onboard the vehicle 10, including decision authority logic for enabling/disabling of high-voltage circuit connectivity as discussed below.

The ESS 19 can be configured as one or more batteries, such as nickel cadmium, lithium ion, or other suitable rechargeable battery device, although other electrical and/or electrochemical devices having the ability to alternately store and deliver HV electrical power to various HV devices onboard the vehicle 10 as needed may also be used within the scope of the invention. The ESS 19 can be sized based on the required functions which the ESS 19 is expected to energize or support, including any regenerative braking requirements or propulsion requirements. The ESS 19 supplies high-voltage electrical power of approximately 60 to 300 volts as noted above, ordinarily in the form of a direct current voltage (VDC).

In addition to the ESS 19, the APM 11 is electrically connected to the ESS 19 and one or more auxiliary systems (AUX) 20 via a low-voltage wiring harness 50. The APM 11 is operable for converting high voltage from the ESS 19 to 12-volt power to keep a 12-volt battery (B) 38 charged, and to drive all of the 12-volt auxiliary loads or systems 20. The battery 38 can be a conventional 12-volt battery, a low-voltage capacitance device, and/or any other suitable low-voltage energy supply or source, with the term "low-voltage" referring herein to the relative voltage level of the APM 11 in comparison to the previously described high-voltage or HV of approximately 60-300V.

The battery 38 is electrically connected to the auxiliary loads or systems 20 via a set of low-voltage lines 25 of the wiring harness 50. The APM 11 is also electrically connected to a signal connector 13 positioned on or within the various HV device or devices and the controller 16. The signal connector 13 acts as part of a high-voltage interlock (HVIL) circuit, the functionality of which is generally described in the background section above. The signal connector 13 acts as an integral check device within an HV terminal assembly 24, as will now be described with reference to FIGS. 2 and 3.

Figure 2:
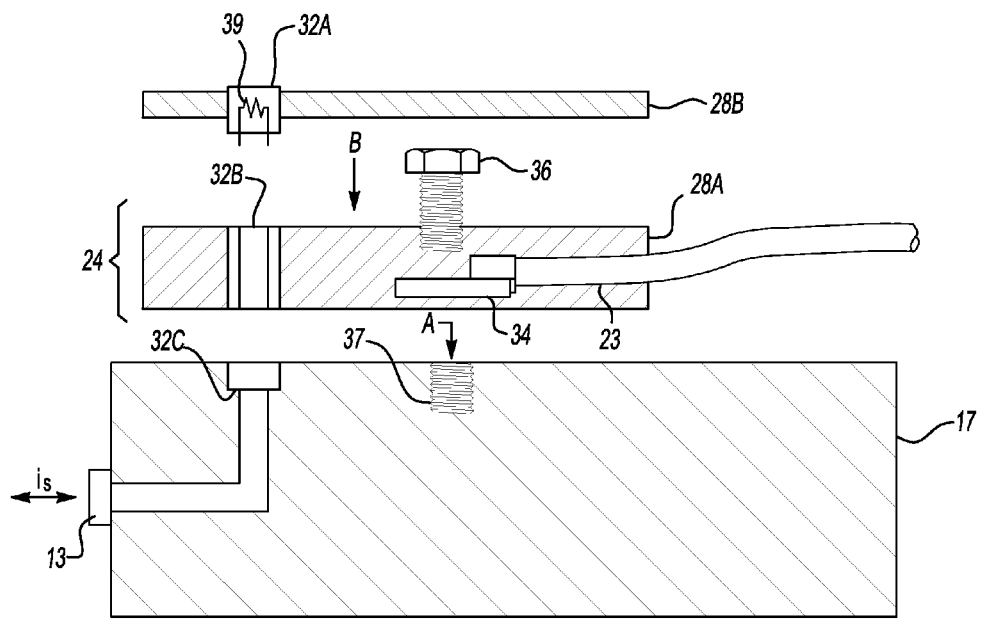
FIG. 2 is a schematic illustration an HV terminal assembly and an exemplary HV device for use with the vehicle of FIG. 1.

Referring to FIG. 2, the HV terminal assembly 24 connects the HV cables 23 to an HV device, shown here as the M/G 17, at a given HV access point onboard the vehicle 10. For simplicity, the M/G 17 will be used hereinafter as the exemplary HV device, however the description is intended to apply to any HV device used onboard the vehicle 10 of FIG. 1. The wiring harness 50 of FIG. 1 includes an integral set of high-voltage interlock (HVIL) source and return (SR) pins 32C, which are connected within or to the M/G 17. The M/G 17 includes an HV bus bar or an HV receptacle 37. For simplicity, only one connection port or outlet is shown for the HV receptacle 37 in FIG. 2, however two or three HV receptacles 37, or however many are needed, can be used within the scope of the invention depending on the particular type of electrical currents used to energize the HV device.

The HV terminal assembly 24 includes a tray portion 28A which is removably mountable to the M/G 17 via a set of bolts 27 (see FIG. 3), and which is configured for securely aligning the set of HV cables 23 with the HV receptacle 37 once so connected. The tray portion 28A contains a terminal 34, which can be configured as a single stamped piece of plated copper or other suitable conductive material shaped or sized as needed depending on the number of individual cables comprising the HV cable 23. The terminal 34 is in one embodiment a ring terminal, but may also be any other suitable configuration for connecting the HV cable 23 to a high-voltage bus bar or HV receptacle 37 via bolts 36 or other fasteners installed in the direction of arrow B.

The HV terminal assembly 24 includes an HVIL jumper device 32B which is connected to the tray portion 28A and electrically engageable or connectable with the set of HVIL SR pins 32C whenever the tray portion 28A is properly installed to the M/G 17 in the direction generally indicated by arrow A. A cover portion 28B, which is preferably constructed of aluminum, provides a weather and electromagnetic field (EMF) shield to the various electrical connections within the tray portion 28A, with the cover portion 28B being removably mountable to the tray portion 28A.

The cover portion 28B includes an integral HVIL shorting plug 32A. The shorting plug 32A is "integral" in the sense that it is locked, secured, retained, or otherwise contained within the overall structure forming the cover portion 28B. The HVIL shorting plug 32A includes a shorting feature 39, such as a length of wire or an electrical resistor, suitable for completing an HVIL circuit aboard the vehicle 10 when the cover portion 28B is properly installed. When configured as an electrical resistor, according to one embodiment the shorting feature 39 has a resistance value of approximately 2.5 to 3.5 kΩ, although other resistance values falling outside of this range can also be used within the scope of the invention without departing from the intended scope.

Referring again briefly to FIG. 1, the HV devices, e.g., the M/G 17, the PIM 44, the APM 11, the ESS 19, and/or any other HV device onboard the vehicle 10, each include the signal connector 13 described above. The signal connector 13 is electrically connected to the wiring harness 50 or otherwise directly or indirectly connected to the APM 11, and is adapted to detect when each of the HVIL SR pins 32C, the HVIL jumper device 32B, and the integral HVIL shorting plug 32A are electrically interconnected to each other to form a closed HVIL circuit, as that term is understood by those of ordinary skill in the art of HVIL devices. As removal or disconnection of any one of the three HVIL components 32A-C will necessarily interrupt or break the low-voltage HVIL circuit, and thus interrupt an HVIL electrical signal represented by the arrow $i_s$, HV energy can be supplied from the ESS 19 to the HV device or devices only when all three of the HVIL components 32A-C are electrically interconnected and properly positioned.

Figure 3:
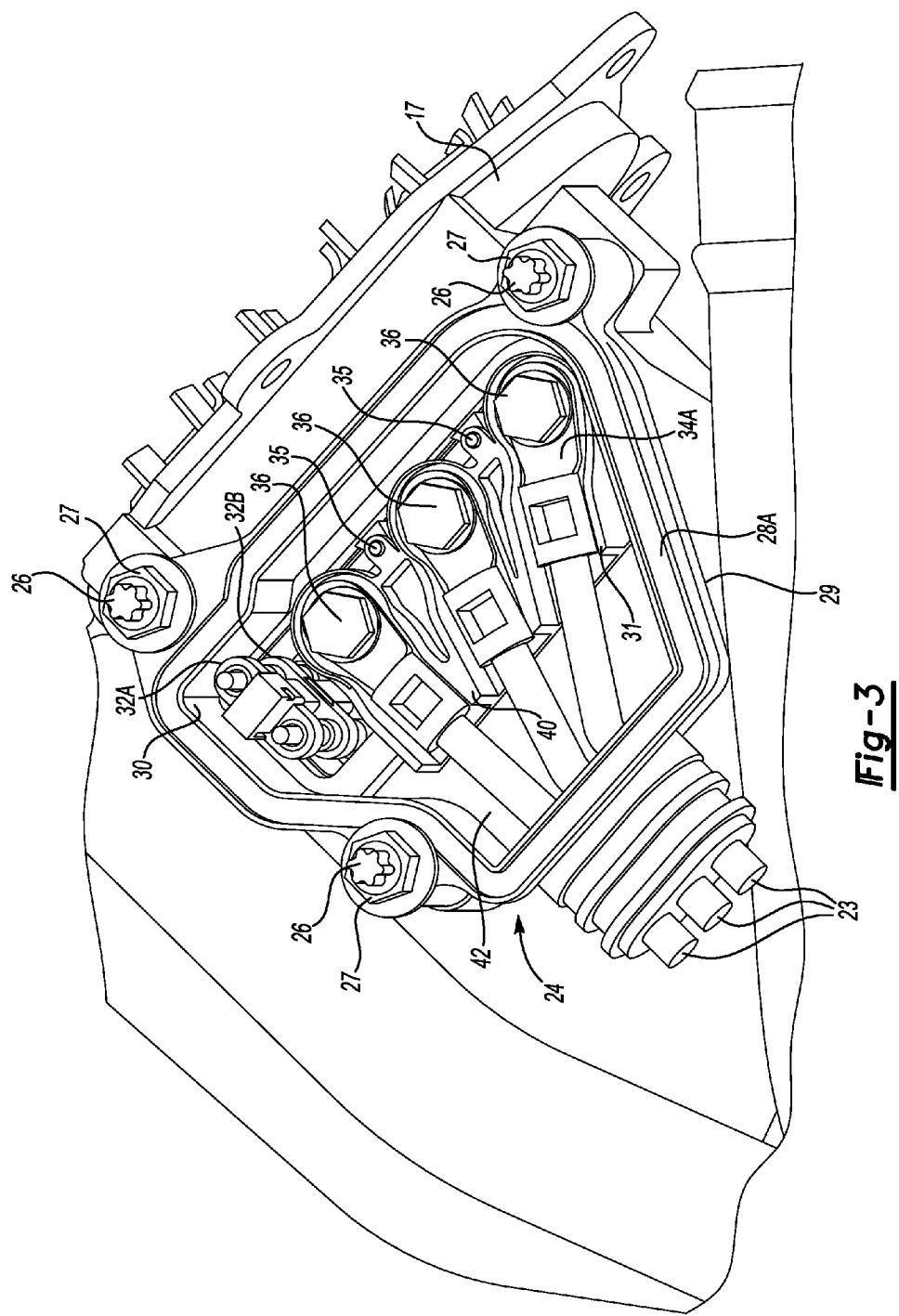
FIG. 3 is a schematic perspective top view of the HV terminal assembly of FIG. 2.

Referring to FIG. 3, the HV terminal assembly 24 of FIG. 2 is shown with the cover portion 28A of FIG. 2 removed for clarity, but with the HVIL shorting plug 32A shown attached as if the cover portion 28A were present. The tray portion 28A has a generally concave interior defined by an inner perimeter wall 30. The tray portion 28A can be constructed of any suitably protective, shielding, and insulating material such as aluminum, and can be further electromagnetically shielded or environmentally sealed from below by a seal or gasket 29, as shown in phantom.

The tray portion 28A contains or holds the terminal 34, which can be configured as a ring terminal 34 (see FIG. 2) as described above, with a plurality of individual terminals or rings 34A each corresponding to a different cable or wire within the HV cable 23. As shown in FIG. 3, the HV cable 23 is a three-phase AC cable having three different cables, although fewer or more cables could also be used within the scope of the invention. The tray portion 28A also includes a retainer plate 31 which receives and securely aligns the HV cable 23 in a predetermined manner to facilitate connection of the HV cable 23 to the HV receptacle 37 (see FIG. 2). The HV cables 23 and terminal 34 would be permanently secured to the retainer plate 31, as would be the HVIL jumper or low-voltage wires 25, so that the retainer plate 31 could not be secured or affixed in place without the HV cables 23 and terminal 34. An optional set of alignment pins 35 can be included to assist with positioning of the tray portion 28A.

For example, the retainer plate 31 can have a plurality of raised fingers, ridges, or splines 40 having lateral or side surfaces 42 that are shaped, sized, contoured, or otherwise configured to securely receive and retain a given HV cable 23 and corresponding ring 34A therein. The tray portion 28A is then securely bolted or fastened to the HV device, shown here as the exemplary M/G 17, using a plurality of respective bolts and nuts 26, 27 as needed. The retainer plate 31 could also be secured in place using the same bolts, screws, or other fasteners that are used to secure the cover portion 28B. The retainer plate 31 and the rings 34A can be bolted or fastened to the motor/generator 17 via a set of bolts 36, thus completing the HV electrical connection at this particular HV access point.

As shown in FIG. 3, the HVIL jumper device 32B of the tray portion 28A is electrically connected to the HVIL SR pins 32C of the M/G 17 (see FIG. 2), which in turn are connected to the signal connector 13 also as shown in FIG. 2. The interface between the tray portion 28A and the M/G 17 is environmentally and electromagnetically sealed and shielded via the gasket 29. Therefore, HV electrical power can once again be supplied to the M/G 17 once the cover portion 28B (see FIG. 2) is properly installed. That is, once the HVIL shorting plug 32A is electrically connected to the HVIL jumper device 32B as shown in FIG. 3, a connection that is feasible only when the cover portion 28B is fully and properly installed, the low-voltage HVIL circuit is closed. The closed HVIL circuit status is communicated to the controller 16 via the signal connector 13 (see FIG. 1), and HV power communication with the ESS 19 of FIG. 1 is thus restored.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
    an energy storage system (ESS) adapted for storing and supplying high-voltage (HV) electrical energy;

an auxiliary power supply adapted for storing and supplying low-voltage electrical energy;
an HV device having an HV receptacle and high-voltage interlock (HVIL) source and return (SR) pins electrically connected to said auxiliary power supply;
an HV cable that electrically connects said ESS to said HV receptacle; and
an HV terminal assembly including:
  a tray portion connectable to said HV device and configured to align said HV cable with said HV receptacle;
  an HVIL jumper device operatively connected to said tray portion and electrically connectable with said HVIL SR pins; and
  a removable cover portion mountable to said tray portion and having an integral HVIL shorting plug, wherein the integral HVIL shorting plug is contained within the removable cover portion and aligns with the HVIL jumper device of the tray portion to close an HVIL circuit when the removable cover is mounted to said tray portion;
wherein said HV terminal assembly is configured to allow said HV electrical energy to be supplied from said ESS to said HV device only when each of said set of HVIL SR pins, said HVIL jumper device, and said integral HVIL shorting plug are electrically interconnected to each other to thereby form a closed HVIL circuit.

2. The vehicle of claim 1, wherein said HV device is a two-phase or a three-phase alternating current (AC) electrical device.

3. The vehicle of claim 1, wherein said HV device is one of: a power inverter module (PIM), an auxiliary power module (APM), a high-voltage (HV) energy storage system (ESS), and an electric motor/generator.

4. The vehicle of claim 1, further comprising a low-voltage wiring harness, wherein said HV device includes a signal connector that is electrically connected to said low-voltage wiring harness and adapted to detect when each of said set of HVIL SR pins, said HVIL jumper device, and said integral HVIL shorting plug are interconnected to each other to thereby form said closed HVIL circuit.

5. The vehicle of claim 1, wherein said integral HVIL shorting plug of said cover portion includes an electrical resistor having a resistance value of approximately 2.5 to 3.5 kΩ.

6. The vehicle of claim 1, wherein said HVIL shorting plug is configured so as to prevent a direct electrical connection between said HVIL shorting plug and said HVIL SR pins.

7. A high-voltage (HV) terminal assembly for connecting a set of HV cables to an HV device at an HV access point onboard a vehicle, the HV device having an integral set of high-voltage interlock (HVIL) source and return (SR) pins, the HV terminal assembly comprising:
  a concave tray portion removably mountable to the HV device and configured for securely aligning the set of HV cables in a predetermined manner;
  an HVIL jumper device connected to said concave portion and electrically engageable with the set of HVIL SR pins; and
  a removable cover portion removably mountable to said concave tray portion, said removable cover portion having an integral HVIL shorting plug contained within the cover portion, wherein the integral HVIL shorting plug aligns with the HVIL jumper device to thereby close an HVIL circuit in the vehicle when the removable cover is mounted to the concave tray portion;
wherein HV is supplied via the set of HV cables to said HV access point only when each of the set of HVIL SR pins, said HVIL jumper device, and said integral HVIL shorting plug are interconnected to each other.

8. The HV terminal assembly of claim 7, wherein said concave tray portion contains a retaining device adapted to secure a different one of said HV cables.

9. The HV terminal assembly of claim 8, wherein said retaining portion is a ring terminal.

10. The HV terminal assembly of claim 7, wherein said HVIL jumper device is integrally formed with said concave tray portion.

11. The HV terminal assembly of claim 7, wherein said HVIL shorting plug includes a shorting wire or a resistor.

12. The HV terminal assembly of claim 7, wherein said HVIL shorting plug is configured so as to prevent a directly electrical connection between said HVIL shorting plug and said HVIL SR pins.

13. The HV terminal assembly of claim 7, wherein the HV device is one of an electronic control unit and an electric motor/generator configured for propelling the vehicle.

14. The HV terminal assembly of claim 7, further comprising a sealing gasket positioned between the HV device and said concave tray portion.

15. A vehicle comprising:
  a high-voltage (HV) energy storage system (ESS);
  an electric motor/generator operable for propelling the vehicle, and having an integral set of high-voltage interlock (HVIL) source and return (SR) pins;
  a set of three-phase HV cables for electrically connecting said electric motor/generator to said ESS at an HV access point; and
  an HV terminal assembly including:
    a concave tray portion removably mountable to said electric motor/generator, said concave tray portion being adapted to securely align each cable of said set of three-phase HV cables in a predetermined manner;
    an HVIL jumper device formed integrally with said concave tray portion, said HVIL jumper device being directly electrically engageable with said HVIL SR pins; and
    a removable cover portion mountable to said concave tray portion and having an integral HVIL shorting plug connected to an interior surface of said removable cover portion, said integral HVIL shorting plug being directly electrically engageable only with said HVIL jumper, wherein the integral HVIL shorting plug is contained within the cover portion, and aligns with the HVIL jumper device to close an HVIL circuit in the vehicle when the cover is mounted to said concave tray portion;
  wherein HV is supplied from said ESS to said HV access point only when said HVIL shorting plug is electrically connected to said HVIL jumper device while said HVIL jumper device is electrically connected to set of HVIL SR pins.

* * * * *

UNITED STATES PATENT AND TRADEMARK OFFICE
Certificate

Patent No. 8,466,586 B2                                                                          Patented: June 18, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: James E. Tarchinski, Rochester Hills, MI (US); William J. Omell, Washington Township, MI (US); Keith D. Van Maanen, Birmingham, MI (US); Ryan M. Meroz, Rochester, MI (US); and Edward A. Rapa, Jr., Waterford, MI (US).

Signed and Sealed this Seventh Day of January 2014.

<div align="right">
JARED FUREMAN<br>
Supervisory Patent Examiner<br>
Art Unit 2836<br>
Technology Center 2800
</div>